United States Patent [19]
Cook et al.

[11] Patent Number: 6,052,558
[45] Date of Patent: Apr. 18, 2000

[54] NETWORKED REPEATER

[75] Inventors: Dean Lawrence Cook, Mesa; Michael J. Andresen, Apache Junction; David Warren Corman, Gilbert, all of Ariz.

[73] Assignee: Motorola, Inc., Schaumburg, Ill.

[21] Appl. No.: 08/842,102

[22] Filed: Apr. 28, 1997

[51] Int. Cl.[7] .................................................. H04B 1/00
[52] U.S. Cl. ........................................ 455/12.1; 455/427
[58] Field of Search ............................... 455/12.1, 13.1, 455/13.2, 427, 562, 524

[56] References Cited

U.S. PATENT DOCUMENTS

| | | | |
|---|---|---|---|
| 4,713,809 | 12/1987 | Mizota | 370/97 |
| 4,742,514 | 5/1988 | Goode et al. | 370/109 |
| 5,018,165 | 5/1991 | Sohner et al. | 375/1 |
| 5,278,989 | 1/1994 | Burke et al. | 455/8 |
| 5,305,467 | 4/1994 | Herndon et al. | 455/524 |
| 5,394,561 | 2/1995 | Freeburg | 455/13.1 |
| 5,603,080 | 2/1997 | Kallander et al. | 455/14 |
| 5,634,193 | 5/1997 | Ghisler | 455/440 |
| 5,678,175 | 10/1997 | Stuart et al. | 455/13.1 |
| 5,678,184 | 10/1997 | Cutler, Jr. et al. | 455/13.1 |
| 5,745,858 | 4/1998 | Sato et al. | 455/562 |
| 5,790,073 | 8/1998 | Tayloe et al. | 455/13.1 |
| 5,805,574 | 9/1998 | Jan et al. | 455/12.1 |
| 5,826,190 | 10/1998 | Kurtz et al. | 455/428 |

FOREIGN PATENT DOCUMENTS

| | | | |
|---|---|---|---|
| 0 724 336 A | 7/1996 | European Pat. Off. | H04B 1/38 |
| 9-144418 | 1/1996 | Japan | H04B 7/26 |

*Primary Examiner*—Nguyen Vo
*Assistant Examiner*—Makoto Aoki
*Attorney, Agent, or Firm*—Gregory J. Gorrie

[57] ABSTRACT

Cellular communication systems (20) use repeaters (50) to communicate with subscriber units (24) otherwise shadowed from base stations (22). A networked repeater (50) is provided for use in a cellular communication system with low-earth orbit satellites (22) and mobile subscriber units (24). Networked repeater (50) includes a base transceiver module (54) for communicating with the base stations (22) and a plurality of subscriber transceiver modules (56), each of which communicates with subscriber units (24). The base transceiver module (54) is located so as to be unshadowed, i.e. able to have unimpeded communication with at least one of the satellites (22). The subscriber transceiver module (56) is located so as to provide unshadowed communication with the subscriber units (24) that would otherwise be shadowed, i.e. unable to have unimpeded communication with any of the satellites (22).

11 Claims, 6 Drawing Sheets

NETWORKED REPEATER

FIELD OF THE INVENTION

The present invention pertains to the field of radio communication system repeaters. More specifically, the present invention pertains to the field of repeaters in use in mobile cellular radio communication systems.

BACKGROUND OF THE INVENTION

In traditional ground-based cellular radio communication systems, base stations are stationary and subscriber units are mobile. Because base stations are stationary, shadowing is static. A subscriber unit in a given location is either unshadowed (able to communicate with at least one of the base stations) or shadowed (able to communicate with none of the base stations).

The problem of communicating with shadowed subscriber units in a system with static shadowing is readily solved by utilizing a traditional repeater. Such a repeater is located so as to be itself unshadowed while simultaneously unshadowing subscriber units that would otherwise be shadowed.

If the base stations are also mobile, e.g. in low-earth orbit satellite-based systems, shadowing is both static and dynamic. A subscriber unit in a given location may be unshadowed (able to communicate with at least one of the base stations at all times), dynamically shadowed (able to communicate with at least one of the base stations at some times and able to communicate with none of the base stations at other times), or statically shadowed (able to communicate with none of the base stations at all times).

A traditional repeater, being essentially a pair of transceivers coupled back to back, is for the most part unsuitable for use in systems with mobile base stations. A repeater location that is itself unshadowed while simultaneously accommodating the unshadowing of the subscriber units may not exist when dynamic shadowing occurs. When dynamic shadowing occurs, a conventional repeater arrangement would require cascaded repeaters to achieve unimpeded communication, leading to timing, interference, and fiscal problems. Similarly, when a traditional repeater is used with a dynamically shadowed subscriber unit, the subscriber unit experiences a conflict of signals between the repeater and a base station at least part of the time, with subsequent interference problems.

With a traditional repeater, there is no practical way for the system to determine which communications pass through the repeater and which do not. The cost of the repeater and its maintenance must then be applied to the system as a whole and disbursed among all subscribers. Hence, a subscriber never using a given repeater would nonetheless be paying for it.

What is needed is a repeater capable of functioning in a system with both mobile base stations and mobile subscriber units, hence with both dynamically and statically shadowed devices. What is also needed is a repeater which provides data so that the cost does not need to be amortized over all users.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE DRAWINGS

Figure 1:
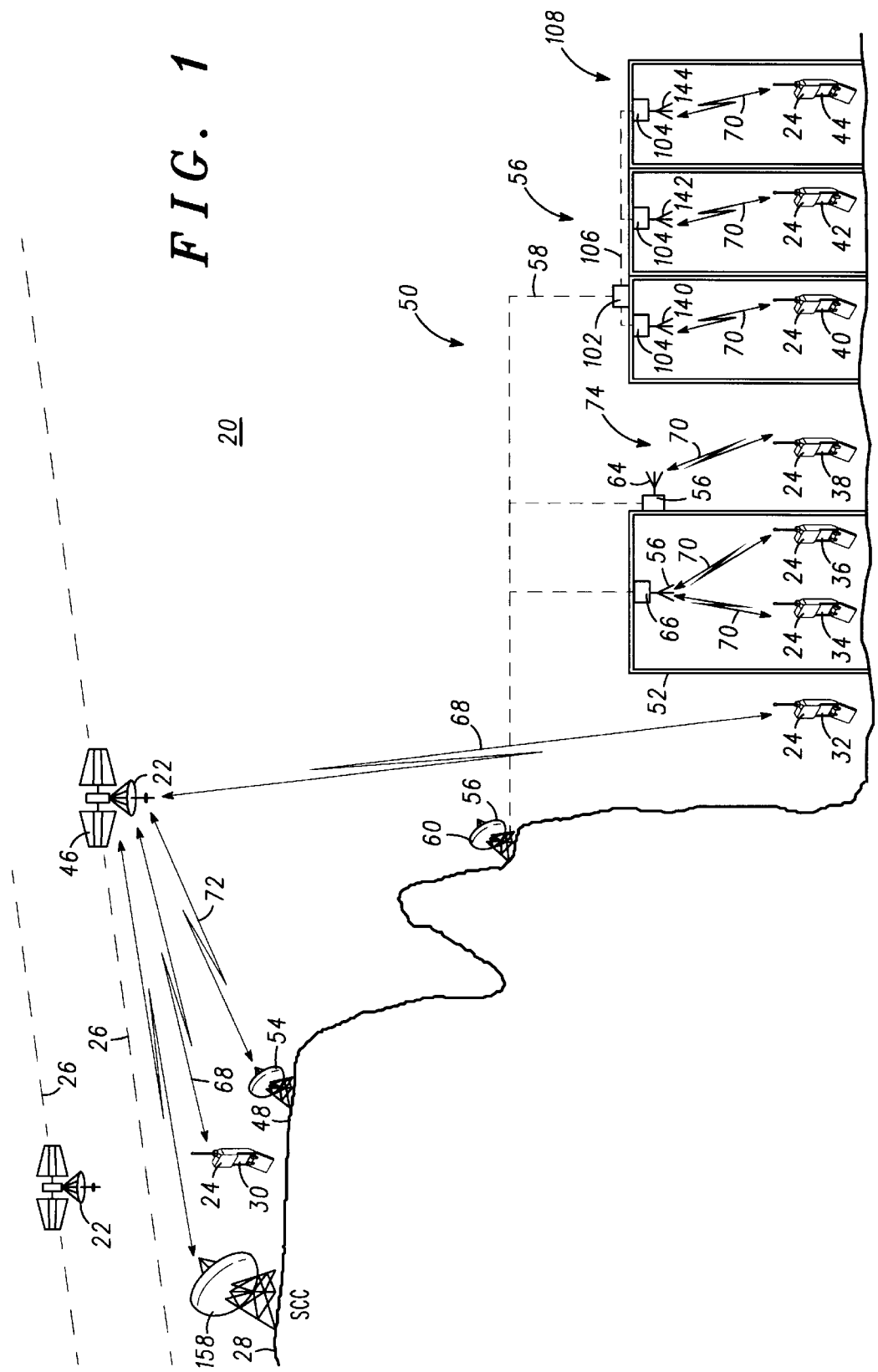
FIG. 1 shows a portion of a satellite-based radio communication system at a first point in time in accordance with a preferred embodiment of the present invention.

In the preferred embodiment, a global cellular radio communication system 20 has a constellation of low-earth orbit satellites 22 communicating with a multiplicity of subscriber units 24. Satellites 22 are sufficient in number and arranged in such a manner that every point on an idealized spherical earth would always have a line-of-sight with at least one of satellites 22, hence any subscriber unit 24 would be able to sustain unimpeded communication with at least one satellite 22. In a real-world case, however, topographical consideration prohibit this idealized condition.

Base stations 22 in system 20 are satellites 22 in low-earth orbits 26. Satellites 22 therefore exhibit significant motion relative to the surface of the earth 28. Since earth 28 is not a perfect sphere, a combination of satellite movement coupled with local topography causes shadowing to be both static and dynamic. A device (subscriber unit, messaging unit, repeater, etc.) at a given location may be able to communicate with at least one satellite 22 at all times. For the purposes of this discussion, such a location and any device thereat is "statically unshadowed" or simply "unshadowed." Alternatively, a device at a given location may be able to communicate with at least one satellite 22 at some times and unable to communicate with any satellite 22 at other times. For the purposes of this discussion, such a location and any device thereat is "dynamically shadowed." Finally, a device at a given location may be unable to communicate with any satellite 22 at any time. For the purposes of this discussion, such a location and any device thereat is "statically shadowed" or "blocked."

Figure 2:
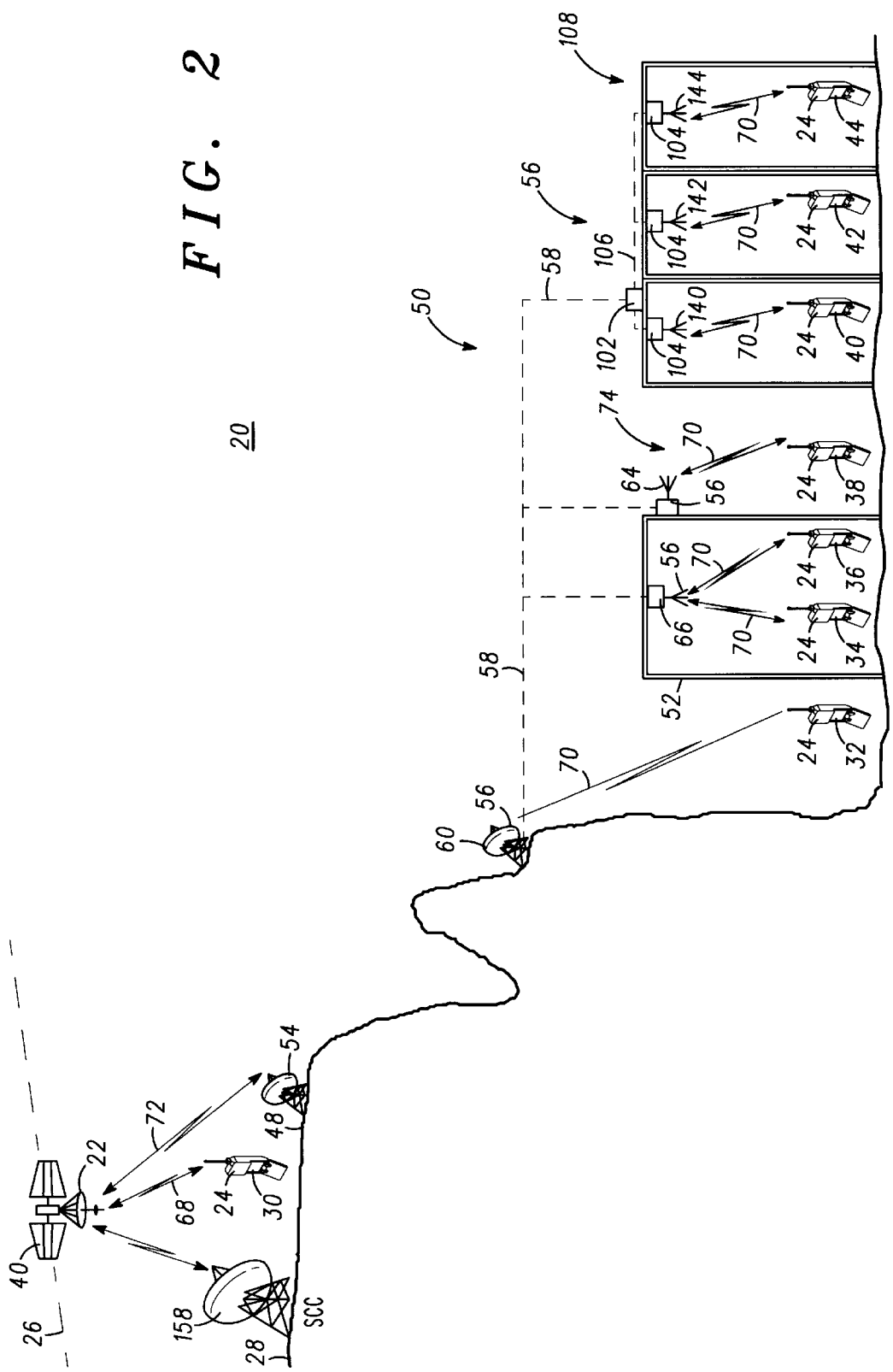
FIG. 2 shows the same portion of the satellite-based radio communication system depicted in FIG. 1 at a second point in time in accordance with a preferred embodiment of the present invention.

FIG. 1 shows a portion of satellite-based radio communication system 20 at a first point in time, while FIG. 2 shows the same portion of satellite-based radio communication system 20 depicted in FIG. 1 at a second point in time in accordance with a preferred embodiment of the present invention. Within system 20, a multiplicity of satellites 22 is placed in non-geostationary orbits 26 about the earth 28. Hence, satellites 22 are mobile.

For the purposes of this discussion, subscriber units 24, are portable or otherwise mobile cellular telephones, but this is not a requirement. A primary purpose of system 20 is to allow subscriber units 24 to communicate with each other and with other subscriber units or telecommunication or data devices in other systems. Since direct subscriber unit end-to-end communication is usually prohibited, a given subscriber unit 24 may communicate with another subscriber unit 24 or telecommunication or data device through at least one satellite 22. For purposes of this discussion, only that portion of the connection extending between subscriber unit 24 and satellite 22 is of concern.

In order to sustain a connection between satellite 22 and subscriber unit 24, communication must be unimpeded. Communication is considered unimpeded when subscriber unit 24 is unshadowed with regard to satellite 22, and when there is no significant interference (another signal, noise, etc.) inhibiting that communication. Conversely, a communication is considered impeded when subscriber unit 24 is blocked or shadowed so that it is momentarily unable to communicate with satellite 22 at all, or when there is interference sufficient to make that communication impossible or unstable.

Referring to FIGS. 1 and 2, an exemplary scenario is shown wherein a series of exemplary subscriber units 30, 32, 34, 36, 38, 40, 42, and 44, in various relationships to an exemplary satellite 46, are having contiguous communications with satellite 46 through two points in time. FIG. 1 shows the relationships between subscriber units 24, 32, 34 and satellite 46 at a first (earlier) point in time, while FIG. 2 shows the same relationships at a second (later) point in time. Satellite 46 has progressed in its orbit 26 between the first and second points in time.

Subscriber unit 30 is in such a location (e.g. atop a bluff 48) that it is statically unshadowed. That is, subscriber unit 30 is always able to communicate with at least one satellite 22. In the exemplary scenario, subscriber unit 30 is able to communicate directly with satellite 46 through the first and second points in time. Therefore, no repeater 50 is required for subscriber unit 30 to have contiguous unimpeded communication with satellite 46.

Subscriber unit 32 is in such a location (e.g. at the foot of bluff 48) that it is dynamically shadowed. That is, subscriber unit 32 is able to communicate with at least one satellite 22 at some times and is unable to communicate with any satellite 22 at other times. In the exemplary scenario, subscriber unit 32 is able to communicate directly with satellite 46 at the first point in time, but is unable to communicate directly with satellite 46 at the second point in time. Therefore, in order for subscriber unit 32 to have contiguous unimpeded communication with satellite 46, networked repeater 50 is provided.

At some third point in time between the first and second points in time, communication with satellite 46 becomes impeded, and subscriber unit 32 then relinquishes communication with satellite 46 and begins communicating with networked repeater 50. That is, subscriber unit 32 is handed off from satellite 46 to networked repeater 50. Subscriber unit 32 then has unimpeded communication with networked repeater 50 and, through networked repeater 50, with satellite 46 through the second point in time.

Subscriber unit 34 is in such a location (e.g. within a first RF-opaque building 52) that it is blocked. That is, subscriber unit 34 is unable to directly communicate with any satellite 22 at any time from this location. In the exemplary scenario, subscriber unit 34 is unable to communicate directly with satellite 46 through both the first and second points in time. Therefore, in order for subscriber unit 34 to have contiguous unimpeded communication with satellite 46, networked repeater 50 is provided. Communication with satellite 46 is impeded through both the first and second points in time, and subscriber unit 34 communicates with networked repeater 50. Subscriber unit 34 then has unimpeded communication with networked repeater 50 and, through networked repeater 50, with satellite 46 through both the first and second points in time.

The remaining exemplary subscriber units 36, 38, 40, 42, and 44, which will be discussed later, are unshadowed, dynamically shadowed, or blocked as determined by their locations.

Figure 3:
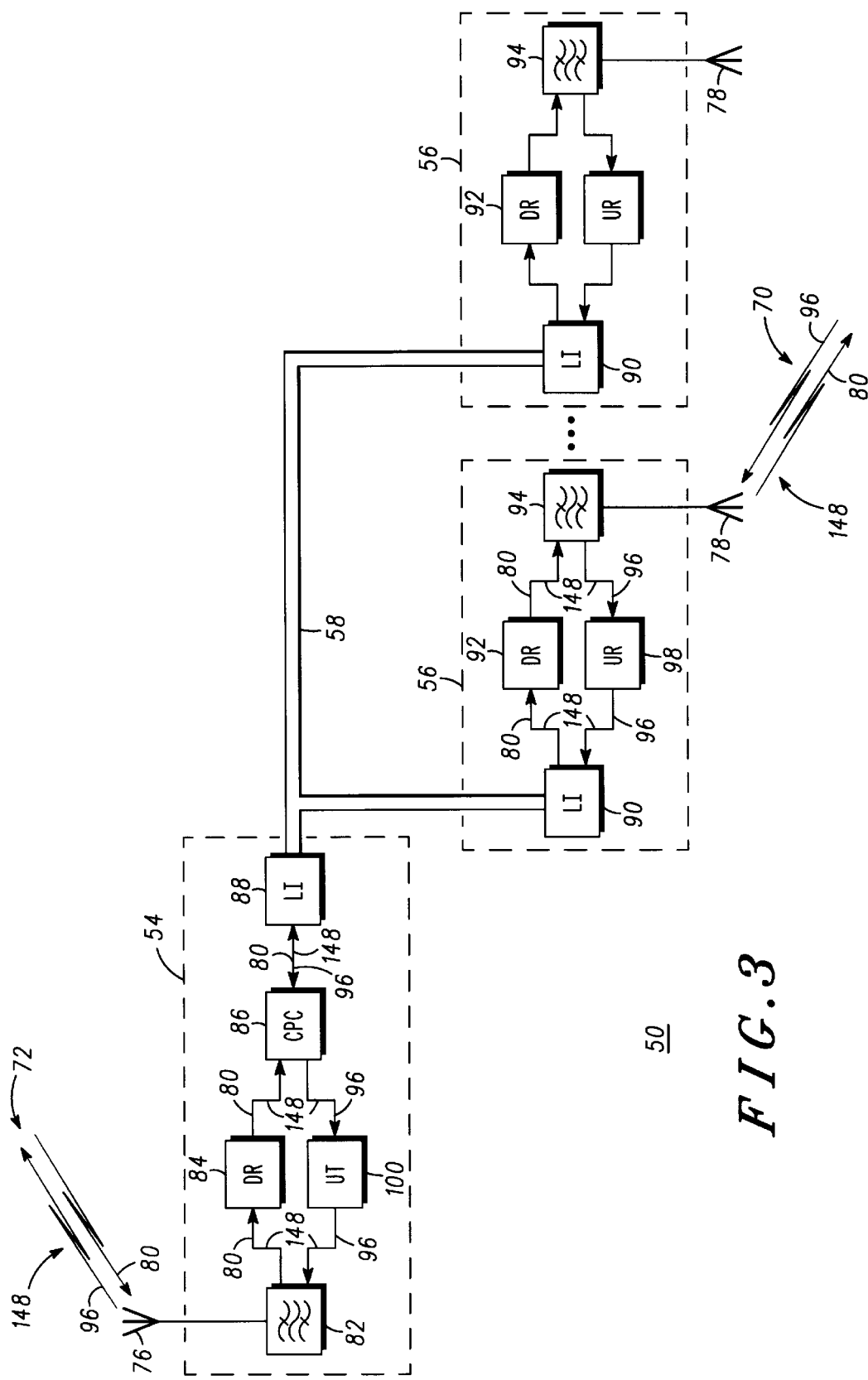
FIG. 3 shows a block diagram of a first embodiment of a networked repeater.

FIG. 3 shows a block diagram of a first embodiment of a networked repeater 50. The following discussion refers to FIGS. 1 through 3.

In the preferred embodiment, the problems associated with a shadowed or blocked subscriber unit 24 are addressed through the use of networked repeater 50. Networked repeater 50 is made up of a base transceiver module 54 and a multiplicity of subscriber transceiver modules 56, all of which are coupled together via a data link 58. Base transceiver module 54 communicates with satellite 22. Subscriber transceiver modules 56 communicate with subscriber units 24.

Networked repeater 50 is "distributed." That is, base transceiver module 54 is physically separated from subscriber transceiver modules 56 and subscriber transceiver modules 56 are physically separated from each other to suit the exigencies of the local topography. In the exemplary scenario, this is depicted by having base transceiver module 54 atop bluff 48, a first subscriber transceiver module 60 on the slope of bluff 48, a second subscriber transceiver module 62 within first RF-opaque building 52, and a third subscriber transceiver module 64 on the wall of building 52 between building 52 and a second RF-opaque building 66.

Subscriber unit 32, being exemplary of subscriber units 24 in the area below bluff 48, is dynamically shadowed. That is, subscriber unit 32 is able to communicate directly with satellite 46 at some times and is unable to communicate directly with satellite 46 at other times. During those times when subscriber unit 32 is able to communicate directly with satellite 46 (see FIG. 1), it does so via a base-subscriber link 68 (also called a satellite-subscriber link 68). During those times when subscriber unit 32 is unable to communicate directly with satellite 46 (see FIG. 2), it communicates indirectly with satellite 46 through subscriber transceiver module 60 of networked repeater 50. In detail, subscriber unit 32 communicates directly with subscriber transceiver module 60 via a repeater-subscriber link 70, which then communicates with base transceiver module 54 via data link 58, which then communicates directly with satellite 46 via a base-repeater link 72. Hence, subscriber transceiver module 60, being mounted high on the side of bluff 48, unshadows the entirety of the area below bluff 48 and subscriber units 24 located therein.

Also, in the exemplary scenario, subscriber units 34 and 36, being exemplary of subscriber units 24 within RF-opaque building 52, are blocked. That is subscriber units 34 and 36 are unable to communicate directly with satellite 46 at any time. Subscriber units 34 and 36 communicate indirectly with satellite 46 through subscriber transceiver module 62 of networked repeater 50. In detail, subscriber units 34 and 36 communicate directly with subscriber transceiver module 62 via repeater-subscriber link 70, which then communicates with base transceiver module 54 via data link 58, which then communicates directly with satellite 46 via base-repeater link 72. Hence, subscriber transceiver module 62, being mounted inside RF-opaque building 52, unshadows the entirety of the area within building 52 and subscriber units 24 located therein.

Again, in the exemplary scenario, subscriber unit 38, being exemplary of subscriber units 24 in urban canyons 74 (the areas between RF-opaque buildings), is dynamically shadowed to the extent that it is essentially blocked. That is, subscriber unit 38 is unable to communicate directly with satellite 46 unless satellite 46 is directly over urban canyon 74. Since this condition occurs only occasionally, subscriber unit 38 is for the most part treated as though it were blocked, and communicates indirectly with satellite 46 through subscriber transceiver module 64 of networked repeater 50. In detail, subscriber unit 38 communicates directly with subscriber transceiver module 64 via repeater-subscriber link 70, which then communicates with base transceiver module 54 via data link 58, which then communicates directly with satellite 46 via base-repeater link 72. Hence, subscriber transceiver module 64, being mounted high upon the wall of RF-opaque building 52 overlooking urban canyon 74, unshadows the entirety of urban canyon 74 and subscriber units 24 located therein.

The exemplary scenario demonstrates the separation of base transceiver module 54 from its associated subscriber transceiver modules 56. Base transceiver module 54 has a base antenna 76 located so as to have an uninterrupted and unimpeded communication with satellites 22, while each associated subscriber transceiver module 56 has a subscriber antenna 78 located so as to have uninterrupted and unimpeded communication with subscriber units 24 in its charge, i.e. within the intended area of coverage and in communication with the given subscriber transceiver module 56.

Data link 58 couples base transceiver module 54 to each subscriber transceiver module 56, and may be realized in any convenient manner, e.g. laser, microwave, radio, fiber optics, coaxial cable, etc., using well-known local-area and/or wide-area networking techniques. It is data link 58 that allows the physical separation of base transceiver module 54 from subscriber transceiver modules 56 and subscriber transceiver modules 56 from each other. By interconnecting the component modules of networked repeater 50, data link 58 makes it possible for network repeater to be distributed. That is, it is the interconnection of base transceiver module 54 to a plurality of subscriber transceiver modules 56 via data link 58, with each module so located as to cover a particular area, that provides an effective solution to the problems of shadowing.

It is further demonstrated by the exemplary scenario that subscriber transceiver modules 56, being dispersed throughout the shadowed areas, are physically separated not only from base transceiver module 54 but from each other. Those skilled in the art will recognize that it is subscriber antennas 78, each a component of one of subscriber transceiver modules 56, that are physically separated from base antenna 76, a component of base transceiver module 54, and from each other. This physical separation represents a barrier to be overcome if networked repeater 50 is to provide unimpeded communication to dynamically shadowed and/or blocked subscriber units 24. This barrier may be one of distance, location, physical obstruction (e.g. a wall or roof), or any other impediment to the propagation of the requisite signals. Further, it will be recognized that it is antennas 76 and 78 that are separated, and the entirety of base transceiver module 54 need not be separated from the entirety of subscriber transceiver module 56 for the two modules to be considered separated.

Those skilled in the art will also appreciate that the exemplary scenario depicts but one of a myriad of possible arrangements. Other scenarios may be devised that, while differing in detail, do not differ in substance from the spirit of the current invention.

Similarly, networked repeater 50 is substantially stationary. That is, base transceiver module 54 and subscriber transceiver modules 56 would normally be mounted as described in the exemplary scenario, in stationary locations. Those skilled in the art, however, will appreciate that networked repeater 50 may be mounted in a mobile location, e.g. on a plane, ship train, etc.

In the preferred embodiment, networked repeater 50 is a smart repeater, i.e. it is capable of receiving, demodulating, restructuring, modulating, and transmitting a signal passing from satellite 22 to subscriber unit 24 or vice versa. The following discussion refers to FIGS. 2 and 3, and describes the operation of networked repeater 50 on a downcast signal 80 passing from satellite 22 to subscriber unit 24.

Downcast signal 80 is transmitted by satellite 22 over a base-repeater link 72, and received at base antenna 76. Base antenna 76 is located so as to be unshadowed. That is, base antenna 76 is so located as to have direct unimpeded communication with at least one satellite 22 at all times. From base antenna 76, downcast signal 80 is passed through a base bandpass filter 82 to a downcast receiver element (DR) 84. In downcast receiver element 84, downcast signal 80 is received and demodulated. Demodulated downcast signal 80 is then accepted by a controller protocol converter (CPC) 86, where it is restructured (to be described later). Restructured downcast signal 80 is passed to a base data link interface (LI) 88, where it is placed upon data link 58 and made available to subscriber transceiver modules 56.

In each of subscriber transceiver modules 56, downcast signal 80 is accepted from data link 58 by a subscriber data link interface (LI) 90 and passed to a downcast transmitter element (DT) 92. Downcast transmitter element 92 modulates and amplifies downcast signal 80, then passes it through a subscriber bandpass filter 94 to subscriber antenna 78. From subscriber antenna 78 downcast signal 80 is transmitted to subscriber units 24 via repeater-subscriber link 70. Subscriber antenna 78 is so located as to unshadow subscriber units 24 which are shadowed with regard to satellite 22. That is, subscriber antenna 78 is so located as to provide unimpeded communication with subscriber units 24 when subscriber units 24 are unable to have direct unimpeded communication with satellite 22.

Similarly, the following discussion refers to FIGS. 2 and 3, and describes the operation of networked repeater 50 on an upcast signal 96 passing from subscriber unit 24 to satellite 22.

Upcast signal 96 is transmitted by each subscriber unit 24 over repeater-subscriber link 70, and received at subscriber antenna 78. Subscriber antenna 78 is so located as to unshadow subscriber units 24 which are shadowed with regard to satellite 22. From subscriber antenna 78, upcast signal 96 is passed through subscriber bandpass filter 94 to an upcast receiver element (UR) 98. In upcast receiver element 98, upcast signal 96 is received and demodulated. Demodulated upcast signal 96 is passed to subscriber data link interface 90, where it is placed upon data link 58 and made available to base transceiver module 54.

In base transceiver module 54, upcast signal 96 is accepted from data link 58 by base data link interface 88 and passed to controller protocol converter 86 where it is restructured (to be described later). Restructured upcast signal 96 is passed to an upcast transmitter element (UT) 100. Upcast transmitter element 100 modulates and amplifies upcast signal 96, then passes it through base bandpass filter 82 to base antenna 76. From base antenna 76 upcast signal 96 is transmitted to satellite 22 via base-repeater link 72. Base antenna 76 is located so as to be unshadowed with regard to satellite 22.

Those skilled in the art will readily appreciate that this preferred embodiment is but one of the possible embodiments wherein signals may be exchanged between satellites 22 and subscriber units 24 through networked repeater 50. For example, controller protocol converter 86 is depicted as being ahead of base data link interface 88 (as regards downcast signal 80). Those skilled in the art will readily understand that controller protocol converter 86 may be placed in other locations within the paths of downcast signal 80 and upcast signal 96 with substantially identical functionality.

Figure 4:
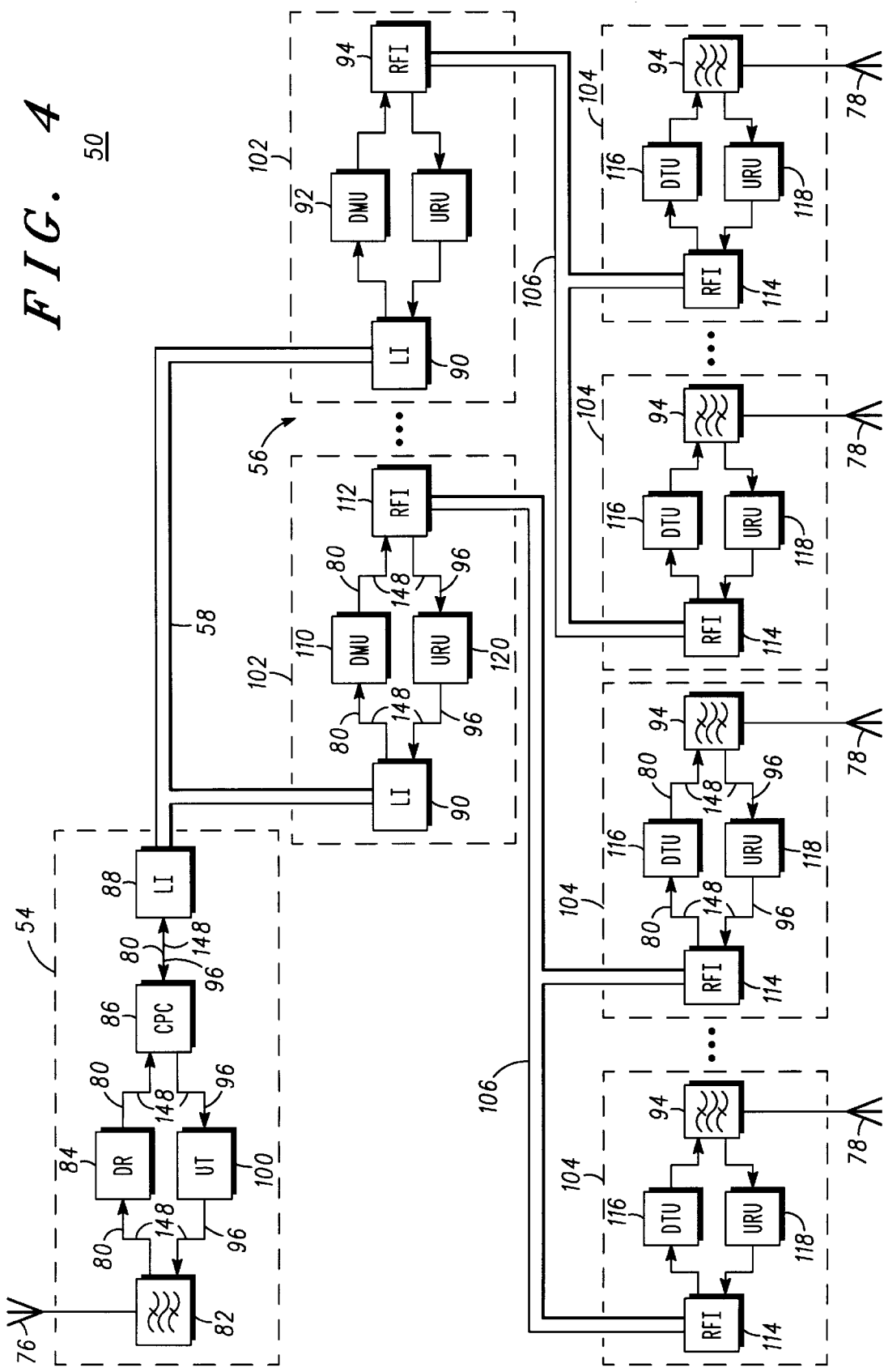
FIG. 4 shows a block diagram of a second embodiment of the networked repeater used in the satellite-based communication system.

FIG. 4 shows a block diagram of a second embodiment of networked repeater 50 used in satellite-based communication system 20. As discussed above, each networked repeater 50 includes a base transceiver module 54 and a plurality of subscriber transceiver modules 56. In this second embodiment, however, each subscriber transceiver module 56 includes a transceiver control assembly 102 and a plurality of transceiver head-end assemblies 104 coupled by an RF combining network 106. The following discussion refers to FIGS. 1, 2, and 4.

This variation of networked repeater 50 from that described above in connection with FIG. 3 is useful where subscriber units 24 are located in multiple blocked areas and there is little possibility of interference within and between these areas. In the exemplary scenario depicted in FIGS. 1 and 2, exemplary subscriber transceiver module 108 has a single transceiver control assembly 102. This single transceiver control assembly 102 then communicates via RF combining network 106 with transceiver head-end assemblies 104 within each blocked area within RF-opaque building 66, providing unshadowed coverage for subscriber units 40, 42, and 44. The details of communication between satellite 46 and subscriber units 40, 42, and 44 are similar to those between satellite 46 and subscriber units 34 and 36 already discussed.

The following discussion refers to FIGS. 2 through 4, and describes the operation of networked repeater 50 on a downcast signal 80 passing from data link 58 to subscriber units 24.

In each of subscriber transceiver modules 56, downcast signal 80 is accepted from data link 58 by a subscriber data link interface 90 and passed to a downcast modulation unit (DMU) 110 within transceiver control assembly 102. Downcast modulation unit 110 modulates downcast signal 80 and passes it to a first RF network interface (RFI) 112, where it is placed upon RF combining network 106 and made simultaneously available to all transceiver head-end assemblies 104 on the network. RF combining network 106 is a conventional RF signal distribution system, and may readily be realized in any medium known to those skilled in the art, e.g. coaxial cable, fiber optic etc.

In each of transceiver head-end assemblies 104, modulated downcast signal 80 is accepted from RF combining network 106 by a second RF network interface (RFI) 114 and passed to a downcast transmission unit (DTU) 116. Downcast transmission unit 116 amplifies downcast signal 80, then passes it through subscriber bandpass filter 94 to subscriber antenna 78. From subscriber antenna 78 downcast signal 80 is transmitted to subscriber units 24 via a repeater-subscriber link 70.

The following discussion refers to FIGS. 2 through 4, and discusses the operation of networked repeater 50 on an upcast signal 96 passing from subscriber unit 24 to data link 58.

Upcast signal 96 is transmitted by subscriber unit 24 over repeater-subscriber link 70, and received by subscriber antenna 78. From subscriber antenna 78, upcast signal 96 is passed through subscriber bandpass filter 94 to an upcast reception unit (URU) 118 within transceiver head-end assembly 104. In upcast reception unit 118, upcast signal 96 is received and amplified. Upcast signal 96 is then passed to second RF network interface 114 and placed upon RF combining network 106, where it is available to transceiver control assembly 102.

In transceiver control assembly 102, upcast signal 96 is accepted from RF combining network 106 by first RF network interface 112 and passed to an upcast demodulation unit (UDU) 120. Upcast demodulation unit 120 demodulates upcast signal 96, then passes it through subscriber data link interface 90 to data link 58 where it is available to base transceiver module 54.

The propagation of downcast signal 80 and upcast signal 96 between satellite 22 and data link 58 is as previously discussed for base transceiver module 54.

Figure 5:
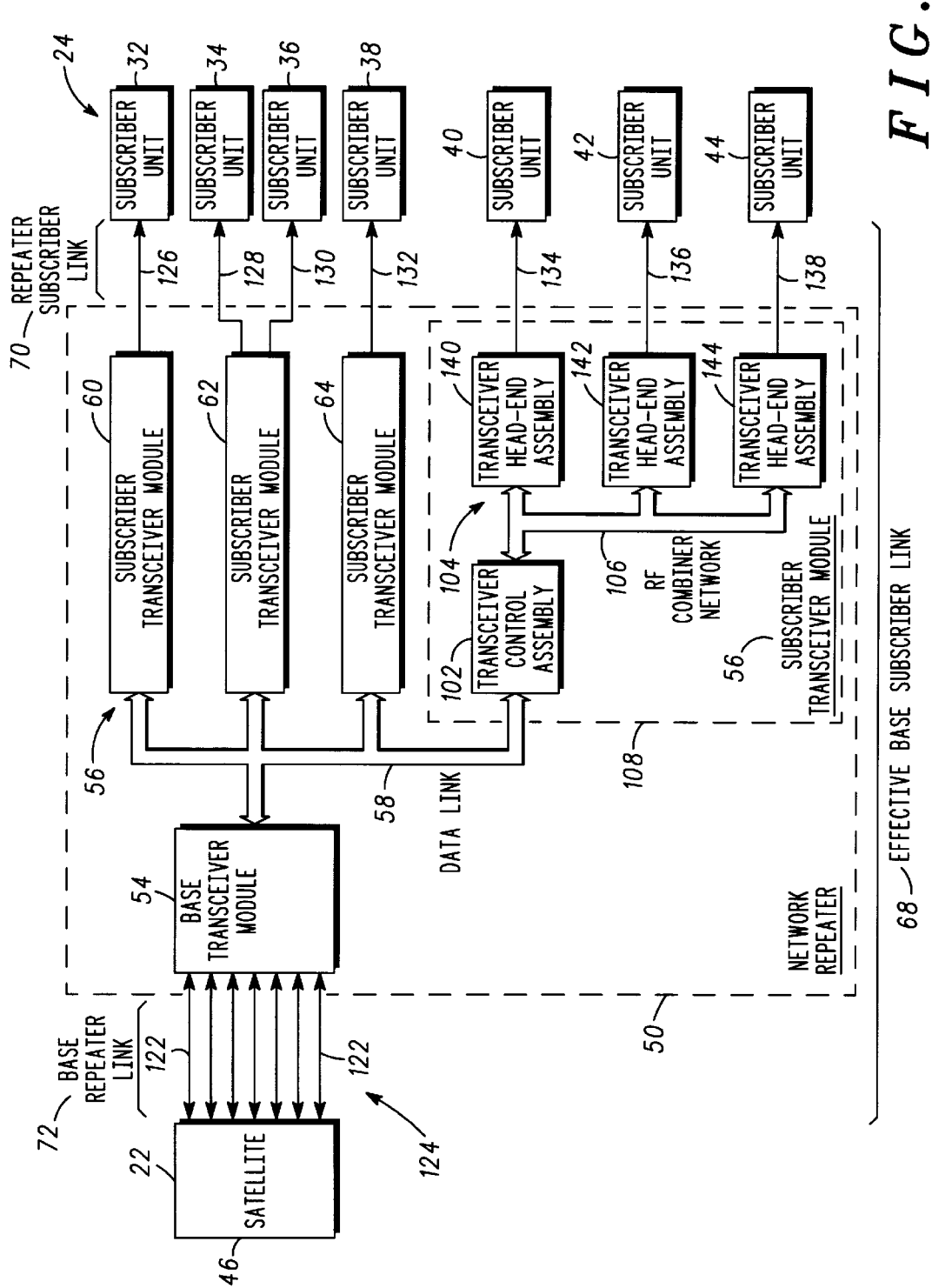
FIG. 5 shows a schematic representation of a multiplicity of signal paths between a satellite and a multiplicity of subscriber units through the networked repeater in accordance with a preferred embodiment of the present invention.

FIG. 5 shows a schematic representation of a multiplicity of signal paths 122 between satellite 22 and a multiplicity of subscriber units 24 through networked repeater 50 in accordance with a preferred embodiment of the present invention. The following discussion refers to FIGS. 2 through 5.

Downcast signal 80 and upcast signal 96 taken together are a bi-directional signal 124 traversing a signal path 122. A specific satellite 22 communicates with a specific subscriber unit 24 via a specific bi-directional signal 124 and over a specific signal path 122. In the exemplary scenario depicted in FIG. 2, satellite 46 communicates with subscriber units 32, 34, 36, 38, 40, 42, and 44 through networked repeater 50.

As depicted in FIG. 5, signal paths 126, 128, 130, 132, 134, 136, and 138 bidirectionally connect satellite 46 with subscriber units 32 through 44. The schematic representation in FIG. 5 parallels the physical representation in FIG. 2.

Signal paths 126 and 132 extend bidirectionally from satellite 46, through base-repeater link 72, through base transceiver module 54, through data link 58, through subscriber transceiver modules 60 and 64 repectively, through repeater-subscriber link 70, and to subscriber units 32 and 38 respectively. Signal paths 126 and 132 are exemplary of situations wherein each subscriber transceiver module 56 serves a single subscriber unit 24.

Signal paths 128 and 130 extend bidirectionally from satellite 46, through base-repeater link 72, through base transceiver module 54, through data link 58, through subscriber transceiver module 62, through repeater-subscriber link 70, and to subscriber units 34 and 36. Signal paths 128 and 130 are exemplary of situations wherein a single subscriber transceiver module 56 serves a multiplicity of subscriber transceiver units 24.

Signal paths 134, 136, and 138 extend bidirectionally from satellite 46, through base-repeater link 72, through base transceiver module 54, through data link 58, through transceiver control assembly 102, through RF combining network 106, through transceiver head-end assemblies 140, 142, and 144 respectively, through repeater-subscriber link 70, and to subscriber units 40, 42, and 44 respectively. Signal paths 134, 136 and 138 are exemplary of situations wherein a single subscriber transceiver module 56, containing transceiver control assembly 102, RF combining network 106, and a plurality of transceiver head-end assemblies 104, serves a multiplicity of subscriber units 24.

Since all signal paths 122 are contiguous between any satellite 22 and any subscriber unit 24, networked repeater 50 is transparent to bi-directional signal 124. In the exemplary scenario, satellite 46 perceives, or otherwise "thinks" it is communicating directly with, subscriber units 32, 34, 36, 38, 40, 42, and 44. Satellite 46 need not perceive the presence of networked repeater 50. Furthermore, since each bi-directional signal 124 received by satellite 46 emanates from the base antenna 76 of base transceiver module 54, satellite 46 perceives subscriber units 32, 34, 36, 38, 40, 42, and 44 as being at the location of base antenna 76. Therefore, base-repeater link 72 simulates a plurality of base-subscriber links 68 from the point of view of satellite 22.

Correspondingly, since each signal path 122 is contiguous, networked repeater 50 is transparent to bi-directional signal 124. In the exemplary scenario, subscriber unit 32 perceives, or otherwise "thinks" it is communicating directly with, satellite 46. Subscriber unit 32 need not perceive the presence of networked repeater 50. Furthermore, since bi-directional signal 124 received by subscriber unit 32 emanates from the subscriber antenna 78 of subscriber transceiver module 60, subscriber unit 32 perceives satellite 46 as being at the location of subscriber antenna 78. Therefore, repeater-subscriber link 70 simulates base-subscriber link 68 from the point of view of subscriber unit 32. A plurality of subscriber units 24 may communicate through a given subscriber transceiver module 56 (in the exemplary scenario, subscriber units 34 and 36 communicate through subscriber transceiver module 64), and repeater-subscriber link 70 simulates a plurality of base-subscriber links 68 from the point of view of the plurality of subscriber units 24.

Each of a connected satellite 22 and subscriber unit 24 perceive the other. Therefore, from the points of view of each of a connected satellite 22 and subscriber unit 24, signal path 122 connecting the two is base-subscriber link 68.

Figure 6:
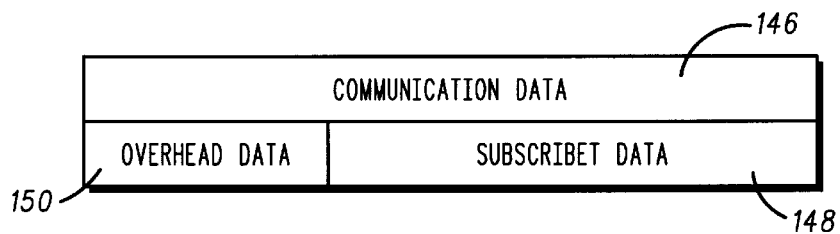
FIG. 6 shows a schematic representation of communications data in accordance with a preferred embodiment of the present invention.

FIG. 6 shows a schematic representation of communications data 146 in accordance with a preferred embodiment of the present invention. The following discussion refers to FIGS. 2, 3, and 6.

In the preferred embodiment, networked repeater 50 is a "smart" repeater. That is, networked repeater 50 communicates with a satellite 22 as though networked repeater 50 were a multiplicity of subscriber units 24 and communicates with a subscriber unit 24 as though networked repeater 50 were a satellite 22. This smart repeater capability is provided through controller protocol converter 86.

During the communication of either downcast signal 80 or upcast signal 96 between satellite 22 and subscriber unit 24, downcast signal 80 and upcast signal 96 are propagated as communication data 146. Communication data 146 is made up of subscriber data 148 and overhead data 150. Controller protocol converter 86 intercepts and processes communication data 146.

Since a principle function of system 20 is to allow subscriber units 24 to communicate with each other and with other telecommunication and data devices through satellites 22, subscriber data 148 is passed through controller protocol converter 86 unaltered. This is not the case with overhead data 150.

Overhead data 150 contains system information. That is, overhead data 150 is that information relevant to the operation of system 20 and its components, as contrasted with subscriber data 148, which is that information relevant to the subscribers but irrelevant to system 20. Typical overhead data 150 can contain channel assignments, subscriber identities, TDMA and FDMA allocations, priority assignments, billing data, etc. The restructuring of communications data 146 by controller protocol converter 86 consists of the reconstruction of overhead data 150 within communications data 146.

Those skilled in the art will appreciate that FIG. 6 is a highly simplified schematic representation of communication data 146 for discussion purposes only, and that in practice subscriber data 148 and overhead data 150 need not have a clear demarcation between them.

For either downcast signal 80 or upcast signal 96 propagating between satellite 22 and subscriber unit 24 through networked repeater 50, controller protocol converter 86 intercepts signal 80 or 96 accordingly, reads and analyses overhead data 150 within that signal, restructures that overhead data 150 as required, and passes restructured signal 80 or 96 on. A typical restructuring of downcast signal 80, for example, can include replacing the channel assignment information transmitted by satellite 22 with new channel assignment information. This replacement would then allow subscriber transceiver module 56 to communicate with subscriber unit 42 on a non-interference basis. This capability allows a designer to use standard frequency division multiple access (FDMA), time division multiple access (TDMA) or a hybrid combination of the two as techniques for preventing interference. Similarly, a typical restructuring of upcast signal 96 can include an inverse channel assignment information replacement.

Additionally, the restructuring of upcast signal 96 can include the insertion of a code indicating that network repeater 50 is used by this communication. Such a usage code can be used in addressing billing considerations, allowing system 20 to add a repeater surcharge to the billing of subscriber units 24 using networked repeater 50. In this way, the cost of networked repeater 50 and its maintenance is charged to those subscribers actually using networked repeater 50. This ability to control billing can be a factor in the determination of where networked repeaters 50 are to be installed within system 20.

Also, it is through the restructuring of overhead data 150 by controller protocol converter 86 that networked repeater 50 establishes a base-repeater link 72 with satellite 22 that simulates a multiplicity of base-subscriber links 68, and establishes a repeater-subscriber link 70 with each subscriber unit 24 that simulates a base-subscriber link 68. Satellite 22 perceives connections with a multiplicity of subscriber units 24 located where base antenna 76 of base transceiver module 54 is located, i.e. in an unshadowed location. Similarly, subscriber unit 24 perceives a connection with satellite 22 located where subscriber antenna 78 of subscriber transceiver module 56 is located, i.e. a location where subscriber unit 24 would be unshadowed. Through these signal simulations, no special provisions need be met by either satellite 46 or subscriber unit 24, thus lowering overhead and cost in the whole of system 20 while simultaneously addressing the problems of shadowing.

Figure 7:
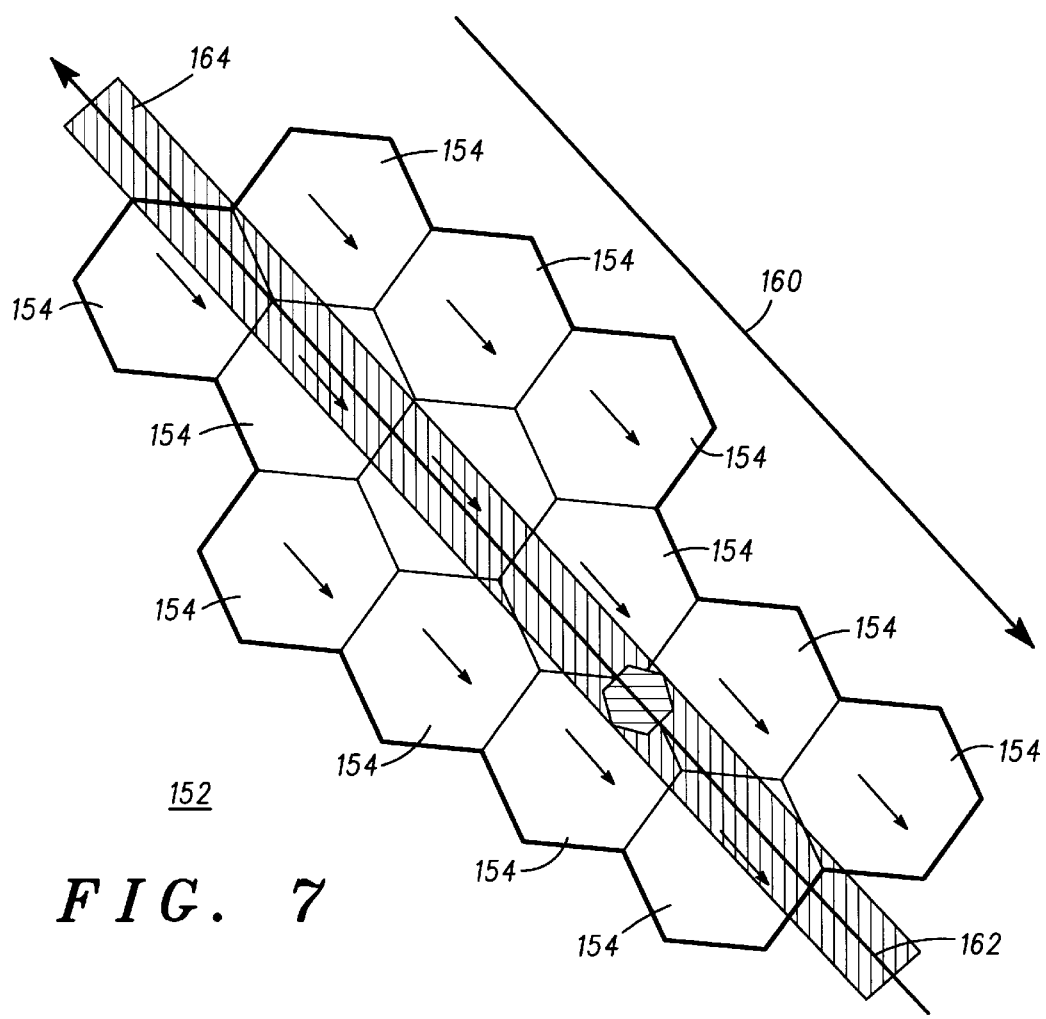
FIG. 7 shows a schematic depiction of a partial satellite footprint in accordance with a preferred embodiment of the present invention.

FIG. 7 shows a schematic depiction of a partial satellite footprint 152 in accordance with a preferred embodiment of the present invention. The following discussion refers to FIGS. 2 and 7.

A relationship exists between satellite cells 154 and a repeater microcell 156. Since system 20 views networked repeater 50 as a stationary, grounded, single-cell satellite 22, satellite beam, or other entity considered by the system during overall spectrum allocation. Accordingly, system 20 allocates channels to networked repeater 50 much as it does for satellites 22. In the preferred embodiment, channel allocation for system 20 is controlled by a system control computer (SCC) 158. By maintaining system-wide channel allocation with system control computer 158, system 20 determines and compensates for relative motions between its components, including satellites 22 and networked repeaters 50.

In FIG. 7, partial footprint 152 represents a field of cells 154 belonging to a given satellite 22 traversing the earth in a specific direction 160. Field of cells 154 is intersecting microcell 156 belonging to stationary networked repeater 50. This has the effect, from the perspective of system 20, of having microcell 156 traversing field of cells 154 in a reciprocal direction 162. Microcell 156 therefore cuts a swath through field of cells 154, creating a zone of potential interference 164 the width of microcell 156 through field of cells 154. At any given time, therefore, microcell 156 potentially interferes with at Least one cell 154. FIG. 7 depicts microcell 154 interfering with three cells 154, designated cells 166, 168, and 170.

System control computer 158 allocates channels to each cell 154 of each satellite 22 in system 20 in such a manner as to prevent interference between any cell 154 and any other cell 154. This allocation scheme includes cells 166, 168, and 170. In addition, system control computer 158 allocates channels to microcell 156 of networked repeater 50 in such a manner as to prevent interference with allocations to any cell 154 along zone of potential interference 164. At the instant of time depicted in FIG. 7, the allocation of channels to cells 166, 168, and 170 and to microcell 156 is such that microcell 156 is prevented from interfering with cells 166, 168, and 170.

An exemplary method of assigning channels to networked repeater 50 entails system control computer 158 sending that channel assignment to networked repeater 50. Upon receipt of the channel assignments, networked repeater 50 places them in a table in memory. Controller protocol converter 86 then informs base transceiver module 54 and each subscriber transceiver module 56 of the appropriate frequencies to be used for operation on the desired channels.

Base-repeater link 72 and repeater-subscriber link 70 can each contain a multiplicity of signal paths (see FIG. 5). Since each signal path 122 is used to propagate a single bi-directional signal 124, the capability exists within base transceiver module 54 and subscriber transceiver module 56 to transmit and receive a multiplicity of signals simultaneously. For reception, downcast receiver element 84 in base transceiver module 54 and upcast receiver element 98 in subscriber transceiver module 56 each contain a multiplicity of demodulators, one for each potential signal to be carried. For transmission, upcast transmitter element 100 in base transceiver module 54 and downcast transmitter element 92 in subscriber transceiver module 56 each contain a like multiplicity of modulators. For the second embodiment of networked repeater 50, reception uses a multiplicity of upcast demodulation units 120 and transmission uses a multiplicity of downcast modulation units 110. Those skilled in the art readily appreciate that the scenario described is but one of myriad techniques of accomplishing simultaneous multi-channel transmission and reception.

A possible simplification of channel assignments exists when networked repeater 50 is covering subscriber units 24 within a blocked location where there is little possibility of interference between cells 154 and microcell 156, e.g. inside an RF-opaque building, underground, etc. In this case, controller protocol converter 86 can relieve system 20 of the need to assign channels. Since there is by definition little possibility of interference, any channels assigned by controller protocol converter 86 to support repeater-subscriber links 70 readily suffice. The indication of this special case may be carried in restructured overhead data 150.

All such allocations are desirably dynamic, that is they are periodically updated to allow for the relative movements between cells 154 and between cells 154 and microcell 156.

Those skilled in the art will readily appreciate that alternative means of channel assignments are possible within the scope of the present invention.

Since networked repeater 50 appears to subscriber unit 24 to be satellite 22, subscriber units request handoffs between satellites 22 and between satellites 22 and networked repeater 50 in a conventional manner. Satellites 22 and networked repeaters 50 therefore hand off subscriber units to other satellites 22 and networked repeaters 50 on demand.

Handoffs can be demonstrated utilizing the exemplary scenario depicted in FIGS. 1 and 2. At the first point in time (see FIG. 1), satellite 46 is overhead. Subscriber unit 32 is unshadowed and is communicating directly with satellite 46. At the second point in time (see FIG. 2), satellite 46 has passed behind bluff 48. Subscriber unit 32 is shadowed and is communicating with satellite 46 through networked repeater 50. At some third point in time between the first and second points in time, satellite 46 begins to pass behind bluff 48 from the point of view of subscriber unit 32. At that third point in time, direct communication between satellite 46 and subscriber unit 32 becomes impeded, i.e. the signal fades as satellite 46 passes behind bluff 48. At the third point in time, therefore, subscriber unit 32 is handed off to networked repeater 50 (specifically to subscriber transceiver module 60). This handoff is accomplished in the conventional manner.

Continuing the handoff scenario, subscriber unit 32, being mobile, may then, at a fourth point in time after the third point in time, enter RF-opaque building 52. At the fourth point in time, therefore communication with subscriber transceiver module 60 becomes impeded, i.e. the signal fades as subscriber unit 32 enters building 52. Simultaneously, the signal communication with subscriber transceiver module 62 within building 52 becomes unimpeded, i.e. the signal increases in strength as subscriber unit 32 enters building 52. At the fourth point in time, therefore, subscriber unit 32 is handed off from subscriber transceiver module 60 to subscriber transceiver module 62. Since, from the point of view of subscriber unit 32, subscriber transceiver modules 60 and 62 are satellites 22, this handoff, too, is accomplished in the conventional manner.

In summary, networked repeater 50 provides a fully functional repeater system for a satellite-based radio communication system with both static and dynamic shadowing, while additionally providing a potential savings in cost and an increase in efficiency.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A networked repeater for a mobile radio communication system, wherein said networked repeater comprises:

a base transceiver module for communicating with a plurality of mobile base stations, each mobile base station located on a satellite moving with respect to earth's surface, said base transceiver having a base antenna located to achieve substantially unimpeded communications with at least one of said mobile base stations;

a subscriber transceiver module having a subscriber antenna for communicating with a mobile subscriber unit, said subscriber transceiver module being physically separated from said base transceiver module;

a data link for communicating between said base transceiver module and said subscriber transceiver module, wherein when direct communication between said mobile subscriber unit and said one mobile base station becomes impeded as a result of the movement of said mobile base stations, said direct communication with said one mobile base station is handed-off to said subscriber transceiver module and said base station transceiver module provides communications between said one mobile base station and said subscriber transceiver module over said data link;

a controller protocol converter coupled to said data link for restructuring overhead data communicated between said one mobile base station and said mobile subscriber unit in response to the handing-off of said mobile subscriber unit to said subscriber transceiver module, and wherein prior to the handing-off, the mobile subscriber unit communicates with the mobile base station over a first channel, and wherein after the handing-off, said base transceiver module communicates with the mobile base station over said first channel, and wherein after the handing-off the controller protocol converter further restructures said overhead data to allocate a different channel for communicating between said subscriber transceiver module said mobile subscriber unit, the first channel and the different channel being non-interfering channels, wherein when direct communication between one of the mobile subscriber units and said one mobile base station subsequently becomes unimpeded as a result of the movement of said mobile base stations, communication between said mobile subscriber unit and said subscriber transceiver module is handed-off to said mobile base station, and said subscriber unit transceiver module refrains from providing communications with said one mobile subscriber unit.

2. A networked repeater as claimed in claim 1 wherein said subscriber transceiver module comprises:

a transceiver control assembly;

a plurality of transceiver head-end assemblies, each of said transceiver head-end assemblies having a subscriber antenna; and an RF combining network for communicating between said transceiver control assembly and each of said transceiver head-end assemblies.

3. A networked repeater as claimed in claim 2 wherein said subscriber antenna in each of said transceiver head-end assemblies is located so as to provide substantially unimpeded communication with said mobile subscriber unit where said mobile subscriber unit does not have unimpeded communication with said base station.

4. A networked repeater as claimed in claim 1 wherein:

said mobile subscriber unit is a first subscriber unit; and said subscriber transceiver module simultaneously communicates with a plurality of said mobile subscriber units wherein said plurality of said mobile subscriber units includes said first subscriber unit.

5. A networked repeater as claimed in claim 4 wherein subscriber units communicate with said mobile base stations over subscriber links:

said base transceiver module communicates with said mobile base station via a base-repeater link; and said controller protocol converter causes said base-repeater link to simulate said subscriber links.

6. A mobile radio communication system comprising:

a plurality of mobile base stations, each located on a satellite moving with respect to earth's surface; and a substantially-stationary networked repeater having a base transceiver module and a base antenna for directly communicating with at least one of said mobile base stations, said base antenna located to achieve substantially unimpeded communications with said at least one of said mobile base stations, wherein, mobile subscriber units are configured for communicating with said mobile base stations and said substantially-stationary networked repeater, and wherein the substantially-stationary networked repeater comprises:

a plurality of subscriber transceiver modules, each having a subscriber antenna for communicating with mobile subscriber units; and a data link coupling the plurality of subscriber transceiver modules with the base transceiver, the plurality of subscriber transceiver modules being geographically separated from the base transceiver, wherein when direct communication between one of the mobile subscriber units and said one mobile base station becomes impeded as a result of the movement of said mobile base stations, said direct communication with said one mobile base station is handed-off to one of said subscriber transceiver modules, and said base station transceiver module providing communications between said one mobile base station and said one subscriber transceiver module over said data link, and wherein when direct communication between one of the mobile subscriber units and said one mobile base station subsequently becomes unimpeded as a result of the movement of said mobile base stations, communication between said mobile subscriber unit and said one subscriber transceiver module is handed-off to said mobile base station, and said one subscriber unit transceiver module refraining from providing communications with said one mobile subscriber unit.

7. A mobile radio communication system as claimed in claim 6 wherein said substantially-stationary networked repeater further comprises:

a controller protocol converter coupled to said data link for restructuring overhead data communicated between said one mobile base station and said one mobile subscriber unit in response to the handing-off of said one mobile subscriber unit to said one subscriber transceiver module, wherein prior to the handing-off, the mobile subscriber unit communicates with the mobile base station over a first channel, and wherein after the handing-off, said base transceiver module communicates with the mobile base station over said first channel, and wherein after the handing-off the controller protocol converter further restructures said overhead data to allocate a different channel for communicating between said subscriber transceiver module said mobile subscriber unit, the first channel and the different channel being non-interfering channels.

8. A mobile radio communication system as claimed in claim 7 wherein:
- a downcast signal is transmitted by said mobile base station to said mobile subscriber unit through said substantially-stationary networked repeater, said downcast signal containing communications data which includes said overhead data;
- said base transceiver module comprises a downcast receiver element coupled to a base antenna and configured to receive said downcast signal from said mobile base station through said base antenna;
- said subscriber transceiver module comprises a downcast transmitter element coupled to a subscriber antenna and configured to transmit said downcast signal to said mobile subscriber unit through said subscriber antenna;
- said downcast receiver element is additionally configured to demodulate said downcast signal to extract said communications data;
- said controller protocol converter is configured to accept said communications data from said downcast receiver element, restructure said overhead data to produce restructured communications data, and pass said restructured communications data to said downcast transmitter element; and
- said downcast transmitter element is additionally configured to modulate said restructured communications data to produce said downcast signal.

9. A mobile radio communication system as claimed in claim 7 wherein:
- an upcast signal is transmitted by said mobile subscriber unit to said mobile base station through said substantially-stationary networked repeater, said upcast signal containing communications data which includes said overhead data;
- said subscriber transceiver module comprises an upcast receiver element coupled to a subscriber antenna and configured to receive said upcast signal from said mobile subscriber unit through said subscriber antenna;
- said base transceiver module comprises an upcast transmitter element coupled to a base antenna and configured to transmit said upcast signal to said mobile base station through said base antenna;
- said upcast receiver element is additionally configured to demodulate said upcast signal to extract said communications data;
- said controller protocol converter is configured to accept said communications data from said upcast receiver element, restructure said overhead data to produce restructured communications data, and pass said restructured communications data to said upcast transmitter element; and
- said upcast transmitter element is additionally configured to modulate said restructured communications data to produce said upcast signal.

10. A mobile radio communication system as claimed in claim 6 wherein said mobile radio communication system is configured to:
- allocate channels to each of said mobile base stations within said plurality, wherein said allocation of channels substantially prevents interference between said mobile base stations; and
- allocate channels to said substantially-stationary networked repeater to prevent interference between said substantially-stationary networked repeater and said mobile base stations.

11. A mobile radio communication system as claimed in claim 10 wherein said mobile radio communication system is configured to periodically update said allocations of channels to each of said mobile base stations and to said substantially-stationary networked repeater, wherein said update maintains said prevention of interference.

* * * * *